(12) United States Patent
Karns et al.

(10) Patent No.: US 7,576,942 B1
(45) Date of Patent: Aug. 18, 2009

(54) SERVO SECTOR FORMAT WITH LARGE LITHOGRAPHIC TOLERANCES

(75) Inventors: Darren William Karns, Evans City, PA (US); Mark David Bedillion, Allison Park, PA (US); Qiang Ling, Pittsburgh, PA (US); Mehmet Fatih Erden, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/107,521

(22) Filed: Apr. 22, 2008

(51) Int. Cl.
*G11B 5/596* (2006.01)

(52) U.S. Cl. .................................. 360/77.08

(58) Field of Classification Search ............... 360/77.08, 360/77.04, 77.02, 75, 78.04
See application file for complete search history.

(56) References Cited

U.S. PATENT DOCUMENTS

| | | | |
|---|---|---|---|
| 5,818,659 A | 10/1998 | Cheung et al. | |
| 5,867,341 A | 2/1999 | Volz et al. | |
| 6,052,250 A | 4/2000 | Golowka et al. | |
| 6,195,220 B1 * | 2/2001 | Ellis et al. | 360/77.08 |
| 6,243,224 B1 * | 6/2001 | Sacks et al. | 360/77.08 |
| 6,426,845 B1 * | 7/2002 | Sacks et al. | 360/77.08 |
| 6,469,849 B1 | 10/2002 | Ellis et al. | |
| 6,574,068 B1 * | 6/2003 | Hampshire et al. | 360/77.08 |
| 6,643,082 B1 | 11/2003 | Belser | |
| 7,023,631 B2 | 4/2006 | Zhang et al. | |
| 7,064,914 B1 | 6/2006 | Erden et al. | |
| 7,161,759 B1 * | 1/2007 | Zhang et al. | 360/75 |
| 7,265,937 B1 | 9/2007 | Erden et al. | |
| 7,333,290 B1 * | 2/2008 | Kupferman | 360/77.08 |
| 7,408,735 B1 * | 8/2008 | Coric | 360/77.04 |
| 2008/0239548 A1 * | 10/2008 | Paul et al. | 360/75 |
| 2008/0239557 A1 * | 10/2008 | Gerasimov | 360/77.08 |

* cited by examiner

*Primary Examiner*—Fred Tzeng
(74) *Attorney, Agent, or Firm*—Kinney & Lange PA (57) ABSTRACT

A method and system determines the position of a transducer head based on permanent servo marks in which the width of the permanent servo marks is greater than the width of the data tracks they are used to identify. The method includes receiving readback signals in response to the permanent servo marks arranged as a number of null bursts and generating position error signals with respect to each null burst. Region based information is extracted based on the position error signals, and the region based information is used in conjunction with the position error signals to generate region-based displacement estimates with respect to each null burst. The region-based estimates are then combined to generate a final displacement estimate that describes the estimated distance between a transducer head and the centerline of a desired data track.

21 Claims, 8 Drawing Sheets

SERVO SECTOR FORMAT WITH LARGE LITHOGRAPHIC TOLERANCES

BACKGROUND

The present invention relates to head positioning control systems in data storage systems and in particular to servo sector formats and associated control systems for positioning a transducer head over a desired data track.

In data storage devices, user data is typically stored on concentric tracks of data located on the surface of the storage media. In addition to the data tracks, position data is also provided on the storage media. The position data can include servo marks that, when read, generally indicate position coordinates (e.g. X, Y coordinates, track number, or sector number) of a transducer head relative to the storage media surface, and in particular to a desired data track over which the transducer head should be positioned. Such devices also include a servo system that positions the transducer head over a selected track based on feedback of the position data. The servo system may have a "seek mode" that moves the transducer from one track to another track based on reading the servo marks. The servo system also may have a "tracking mode" in which the transducer is precisely aligned with a selected track based on a reading of the servo marks.

A particular sub-set of servo marks include permanent servo marks that are created through lithographic processes on the storage device at the time of manufacture. During operational use of the data storage device, the transducer reads the servo marks but there is typically no need to erase and rewrite servo data during operation. The position of permanent servo marks on the media for a magnetic data storage device is therefore stable and does not change significantly during the operational life of the data storage device.

Various lithographic processes may be employed to create the permanent servo marks on the storage device, such as low-energy ion implantation, defect mapping, and imprint annealing. However, each of these methods requires a lithographic master pattern to generate the relevant servo marks. In conventional servo sector formatting, the size of the servo marks are equal to the size or pitch of the data tracks they help to identify. As track widths continue to decrease to provide higher density data storage, the costs associated with lithographically producing servo marks of equal size increases.

Therefore, a need has been shown to exist for servo sector formats having large lithographic tolerances that can still be used to position a transducer over a desired track.

SUMMARY

In one aspect, the present disclosure describes a data storage system that is comprised of a data storage medium, a transducer head, a servo demodulator, and a controller. The data storage medium further includes a plurality of data tracks defined by a width d1 and a plurality of permanent servo sectors pre-recorded on the storage medium. In particular, each servo sector includes a first null burst that includes a first portion and a second portion and a second null burst that includes a third portion and a fourth portion. Each portion of the null bursts is defined by a width d2 that is greater the width d1 of the data tracks. The servo demodulator is connected to receive readback signals generated in response to the transducer head moving over the servo sector. A corresponding position error signal is generated in response to each null burst. Servo demodulator also acts to extract region-based information based on the position error signals. The servo demodulator generates region-based displacement estimates with respect to each null burst based on a combination of the position error signals and the extracted region-based information. Based on the region-based displacement estimates generated with respect to each null burst, a final displacement estimate is generated by the servo demodulator. In response to the final displacement estimate, the controller generates servo control instructions to control the positioning of the transducer head over a desired track.

The present disclosure also describes a method for determining displacement of a transducer head from a desired track using servo sector fields in which each servo sector field has at least a first null burst having a first portion and a second portion and a second null burst having a third portion and a fourth portion. In particular, each portion of the null bursts has a width that is greater than a width of the data tracks. The method includes receiving readback signals generated by the transducer in response to each null burst. Based on the readback signals, position error signals (PES) are generated for each null burst. Based on the PES's generated with respect to each null burst, PES-based displacement estimates are generated with respect to each null burst. Based on the PES-based displacement estimates, information regarding the region in which the transducer head is operating is extracted, and this regional information is used to generate region-based displacement estimates with respect to each null burst. A final displacement estimate is then generated based on the plurality of region-based displacement estimates.

The present disclosure also describes a data storage medium that includes a plurality of data tracks and at least one servo sector format. In particular, the servo sector format includes a first null burst, a second null burst, a third null burst and a fourth null burst. Each null burst includes a repeating pattern that consists of a first portion and a second portion. In addition, each null burst is offset by ½ the width of the data track relative to neighboring null bursts. Each portion of the null burst is defined by a width that is greater than the width of the data tracks defined on the data storage medium.

DETAILED DESCRIPTION

Figure 1:
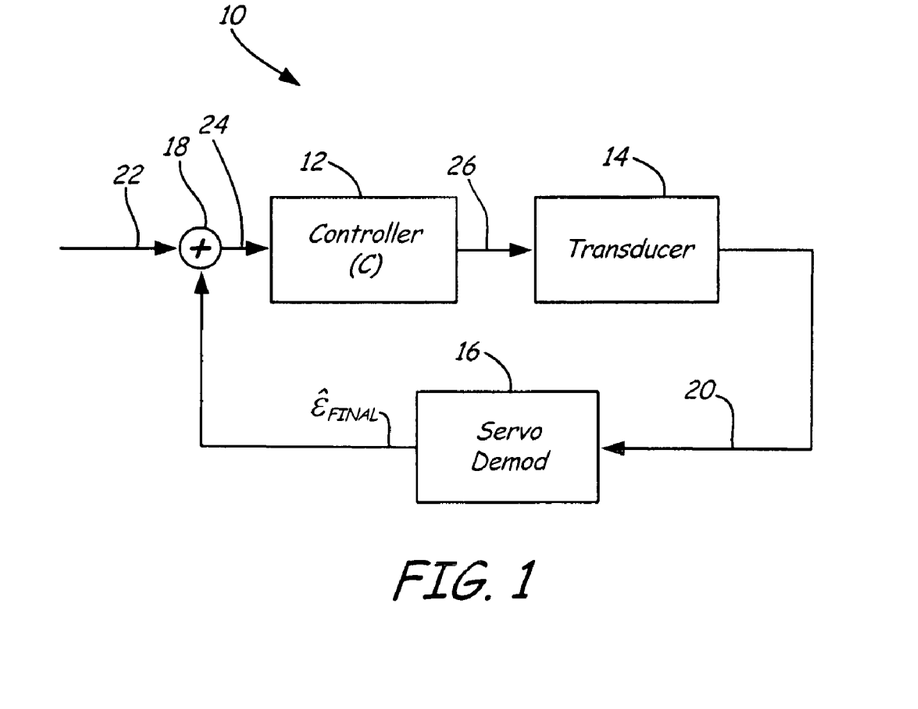
FIG. 1 is a block diagram of a servo system for controlling a transducer head.

FIG. 1 is a diagram of servo system 10, which provides for the control of the position of a transducer head (not shown). Servo system 10 may be employed in a variety of data storage systems, including magnetic storage devices, optical storage devices, and ferroelectric storage devices (often referred to as Probe storage devices), that require the fine positioning of a transducer over a desired track of data. In particular, the servo system 10 of the present invention provides for the positioning of the transducer head over the desired track based on servo bursts having a lithographic tolerance greater than the track width. This is in contrast with traditional servo sector formats used to provide positional information, in which the lithographic tolerances of the servo bursts were required to be equal to the width of the data tracks they are used to identify.

Servo system 10 includes controller 12, transducer head 14, servo demodulator 16, and summer 18. Read back signals 20 are generated by transducer head 14 in response to permanent servo sector marks and are communicated to servo demodulator 16. In response to read back signals 20, servo demodulator 16 generates a displacement estimate ∈ that represents the distance between the center of the transducer head and the desired track. The calculation of the displacement estimate ∈ requires special post-processing steps to account for the lithographic tolerances of the servo sectors being greater than the width of the data tracks over which transducer head 14 is positioned.

The displacement estimate ∈ is compared to a desired displacement estimate 22 and the difference signal 24 is provided as an input to controller 12. In response, a head positioning control signal 26 is generated by controller 12 and provided to plant 14 to correctly position the location of the transducer head with respect to the desired track In particular, the read back signal 20 provided by transducer head 14 is produced in response to sensing servo sectors on the recording medium (not shown). As discussed in more detail below, the servo sectors include permanent servo marks organized as null bursts and spaced radially with respect to each track. Read back signal 20 is generated as a result of the transducer head 14 moving over the servo marks. The resultant read-back signal 20 is demodulated by servo demodulator 16 to generate a position error signal (PES). In conventional servo sector formats, wherein the lithographic tolerance of the permanent servo marks are equal to the track width, servo demodulator 16 employs simple post-processing of the PES to generate a displacement estimate ∈. In the present invention, in which the lithographic tolerances of the permanent servo marks are greater than the track widths, additional post-processing is required to determine the displacement ∈ representing the distance between transducer head 14 and a particular data track.

Figure 2A:
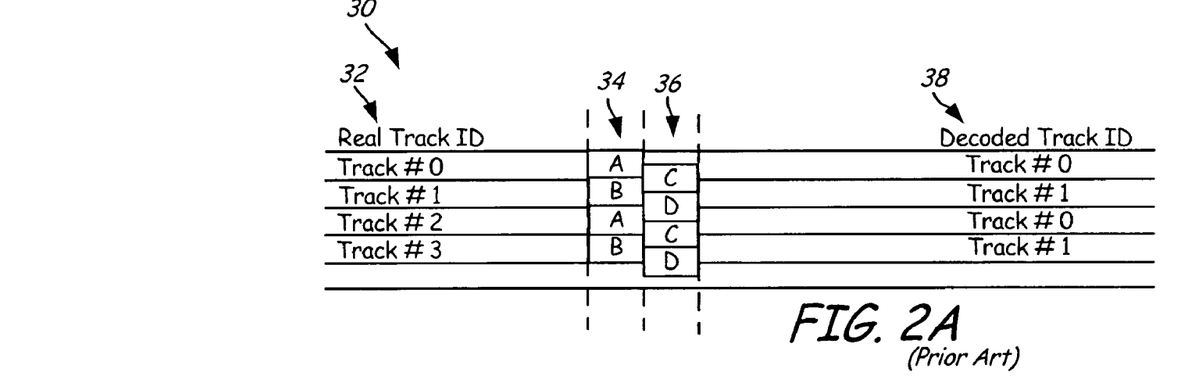
FIGS. 2A and 2B are diagrams illustrating a servo sector format as known in the prior art.
Figure 2B:
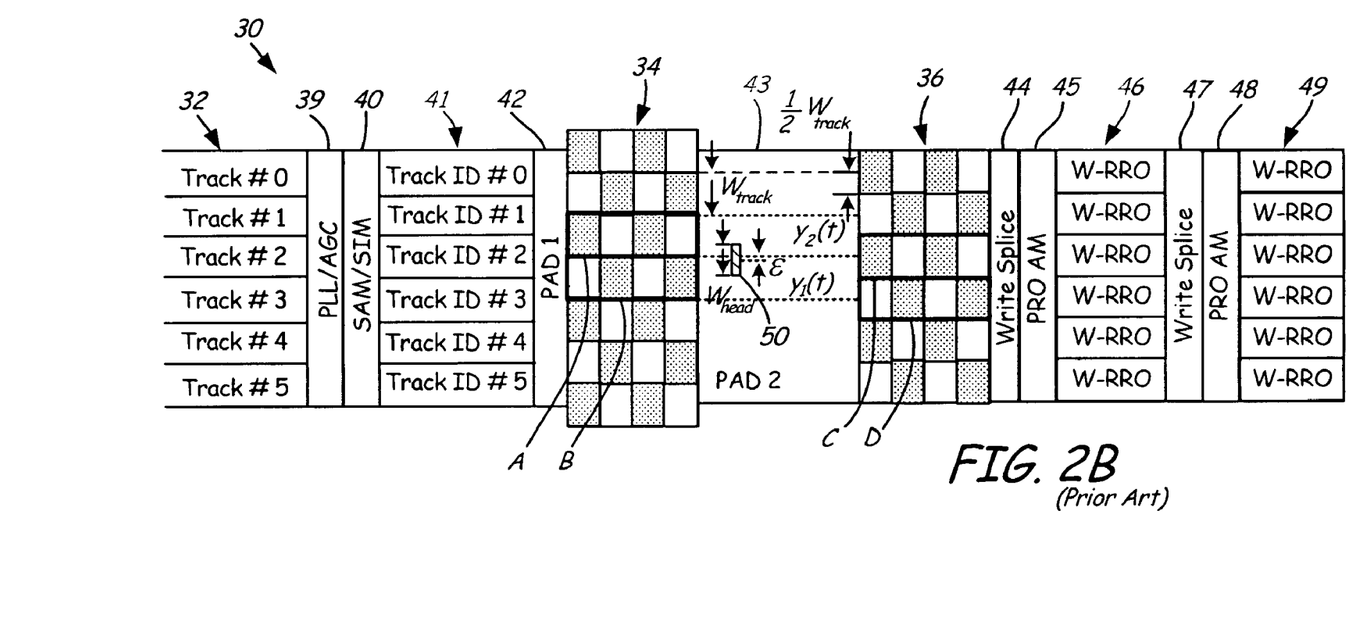

To better illustrate the difference between conventional servo systems and the servo system of the present invention, FIGS. 2A and 2B are provided to illustrate a conventional servo sector formats as well as the calculation of displacement estimates ∈ based on read back signals generated in response to the conventional servo sector formats.

FIG. 2A is a block diagram of a portion of a conventional recording medium 30 that includes data tracks 32 and null bursts 34 and 36. In particular, FIG. 2A illustrates the relationship between the width of the data tracks 32 and the lithographic tolerances employed within null bursts 34 and 36, in which the width of individual portions of the null bursts (labeled 'A', 'B', 'C' and 'D') is equal to track width. FIG. 2A also illustrates the number of unique tracks that can be identified (labeled track ID 38) based on null bursts 34 and 36. In this particular example, only two unique tracks can be identified based on the information retrieved from servo sector formats 34 and 36.

FIG. 2B is a diagram illustrating in additional detail conventional recording medium 30 and the method by which the displacement estimate ∈ is calculated. In this embodiment, recording medium 30 includes data tracks 32, PLL/AGC field 39, SAM/SIM field 40, data track ID fields 41, PAD field 42, null burst 34, PAD field 43, null burst 36, write splice field 44, PRO AM field 45, W-RRO field 46, write splice field 47, RRO AM field 48 and R-RRO field 49. The PLL/AGC field 39 is used to recover timing (i.e., to ensure the signal is sampled at the correct sampling instants). The SAM/SIM field 40 stores the same data along the cross-track direction, which works as Servo Address Mark (SAM) or Servo Index Mark (SIM). Track ID field 41 stores a unique ID associated with a particular track. In particular, track ID field 41 is used to roughly position transducer head around the desired track. The null bursts 34 and 36 (labeled PS1 and PS2) contain a repeating sequence of null patterns. As discussed above, readback of the null bursts 34 and 36 is what allows precise displacement estimates describing the position of the transducer head relative to the desired track to be determined. The remaining fields (W-RRO field 46, RRO AM field 48, and R-RRO Field 49) are used to make final adjustments before beginning a read or write process.

In this embodiment, data tracks 32 and data track ID field 41 has a width labeled $W_{track}$ that is equal to the width of null patterns (labeled 'A', 'B', 'C' and 'D'). Track ID field 41 is gray-coded such that if transducer head detects the track ID of a desired track, the displacement of the transducer head from the desired track can be estimated at no more than ½ the width of the track. Null bursts 34 and 36 are employed to determine more precisely the displacement ∈ of transducer head 44 relative to the centerline of a desired track (in this example, track #2).

Null bursts 34 and 36 are then used to determine transducer head displacement ∈ within the range of [−Wtrack/2, Wtrack/2] as determined by track ID 41. As illustrated, null burst 34 consists of portions 'A' and 'B', each portion having a sequence of positive polarization (shaded) and negative polarizations (white) in an alternating sequence. The polarization sequence of portion 'A' is opposite that of portion 'B', and the portion repeat in the vertical direction. The horizontal boundary between portion 'A' and portion 'B' lies exactly at the center of particular data track (in this example, track #2).

A read-back signal, denoted as $y_1(t)$ and $y_2(t)$, is generated in response to transducer head 50 moving over portion 'A' and portion 'B'. In response to the readback signals $y_1(t)$ and $y_2(t)$ a position error signal (PES) is generated based on a linear combination of the readback signals. The amplitude associated with each readback signal, and in particular, the ratio between the amplitudes of each readback signal, indicates the position of the transducer head with respect to each null pattern 'A' and 'B'.

Similar calculations are performed for null burst 36, which as shown in FIG. 2B is vertically offset by half the width of a track (½ $W_{track}$) from the position of null burst 34. Like null burst 34, null burst 36 consists of portions 'C' and 'D', each portion having a sequence of positive and negative polarization in an alternating sequence. For example, portion 'C' of null burst 36 has a polarization pattern identical to that of portion 'A' of null burst 34 and is shifted downward by half a track width relative to portion 'A'. Likewise, portion 'D' of null pattern 36 has a polarization pattern identical to that of portion 'B' and is shifted downward by half a track width relative to null pattern 'B'. Read-back signals are generated in response to transducer head 50 moving over null burst 36 in similar fashion to the read back signals derived from null burst 34. In response to the readback signals, a position error signal (PES) corresponding to null burst 36 can be calculated.

The position error signals (PES) calculated with respect to each null burst 34 and 36 are used to calculate independent estimates of head displacement ∈̂. A simple post-processing scheme is used to combine the independent estimates of head displacement ε into a final head position or displacement estimate $\hat{\varepsilon}$. The final displacement estimate $\hat{\varepsilon}$ is provided as feedback to a servo controller to finely position transducer head 50 directly over the desired track.

In the conventional example shown in FIGS. 2A and 2B, the null bursts only allow for the decoding of two tracks (as indicated by decoded track ID 38 shown in FIG. 2A). That is, for each combination of null bursts defined by portions 'A', 'B', 'C' and 'D' only two unique tracks may be identified. In addition, the lithographic tolerances of null bursts 34 and 36 (i.e., the width associated with portions 'A', 'B', 'C', and 'D') have a width that is equal to the width of the tracks they are used to identify. As track widths continue to decrease the width of the lithographic tolerances of the null bursts used to identify the tracks will need to decrease proportionally. However, the advent of new data storage techniques has decreased the width of data tracks below the lithographic tolerances used to generate the permanent servo marks. Thus, the present invention provides for a servo sector format that employs null bursts defined by lithographic tolerances greater than the width of the data tracks that they are used to identify, such that standard lithographic tolerances may still be employed to generate the permanent servo marks.

Figure 3:
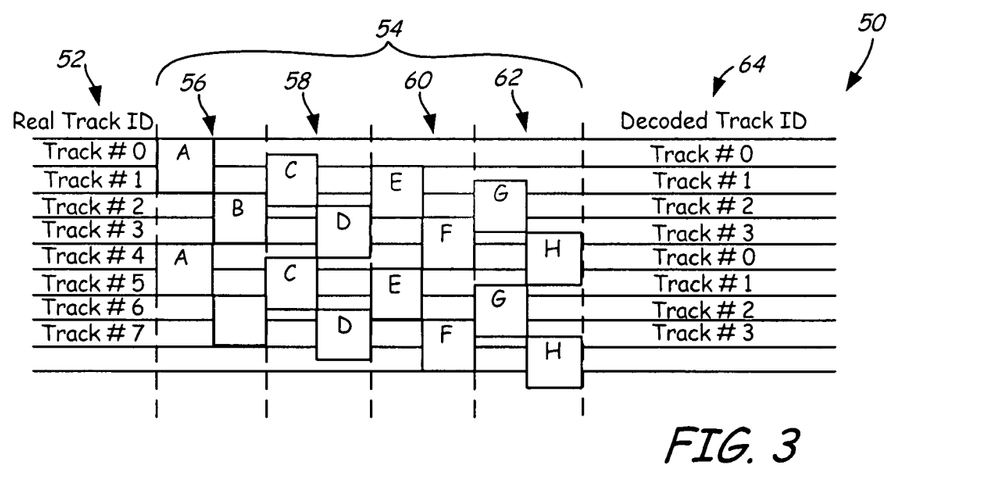
FIG. 3 is a simple diagram of an exemplary embodiment of a servo sector format of the present invention.
Figure 4:
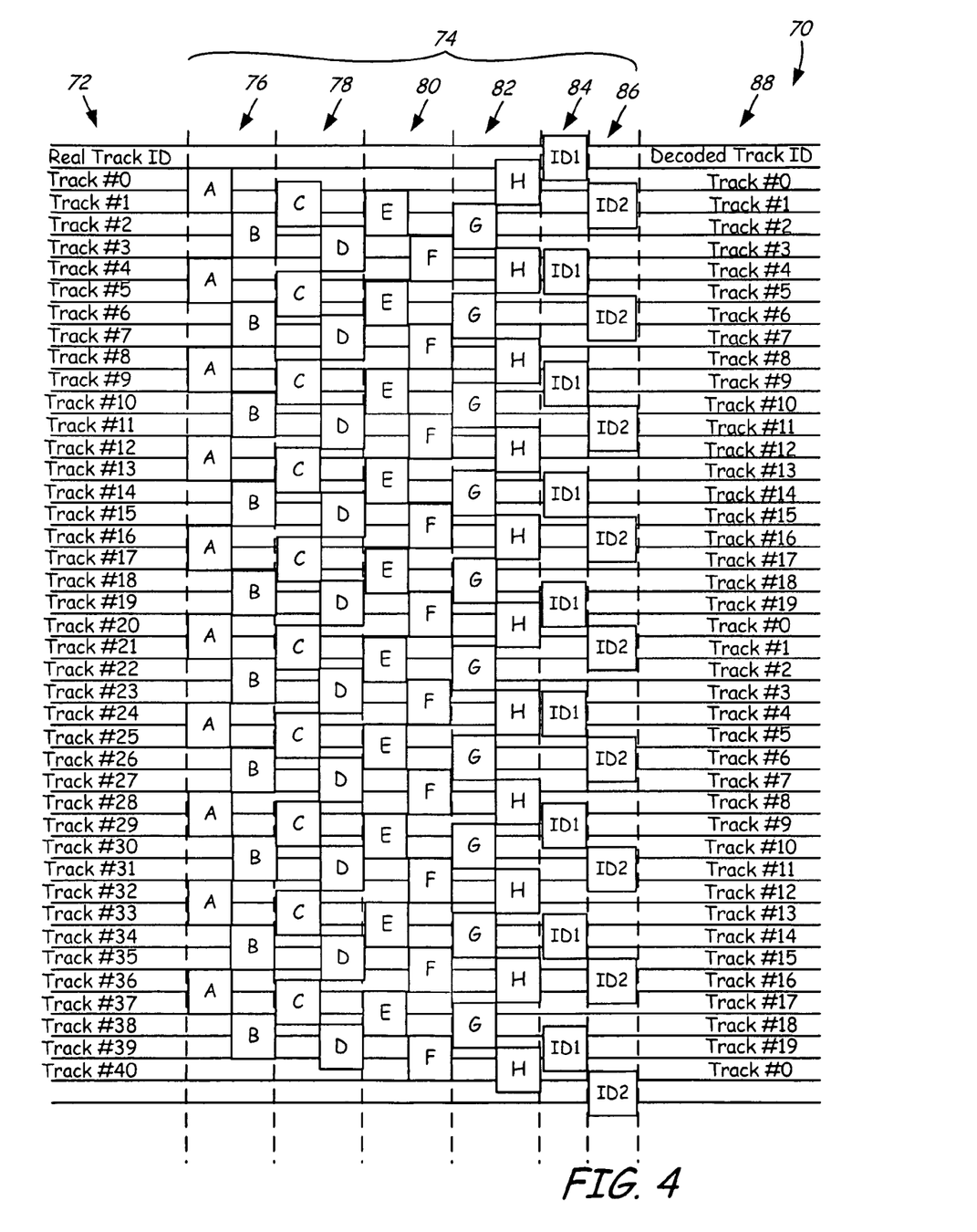
FIG. 4 is a simple diagram of an exemplary embodiment of a servo sector format of the present invention.
Figure 5:
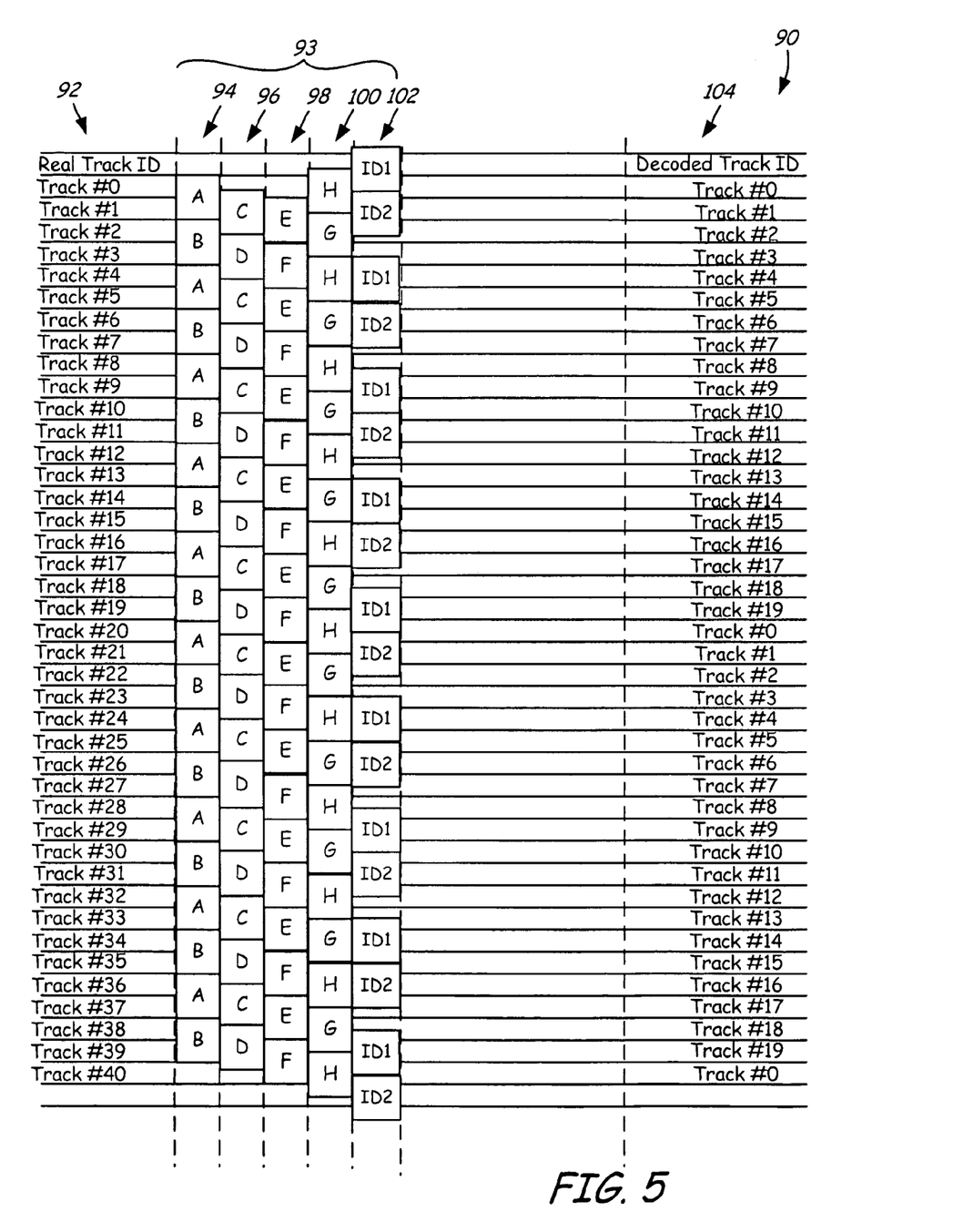
FIG. 5 is a simple diagram of an exemplary embodiment of a servo sector format of the present invention.
Figure 6:
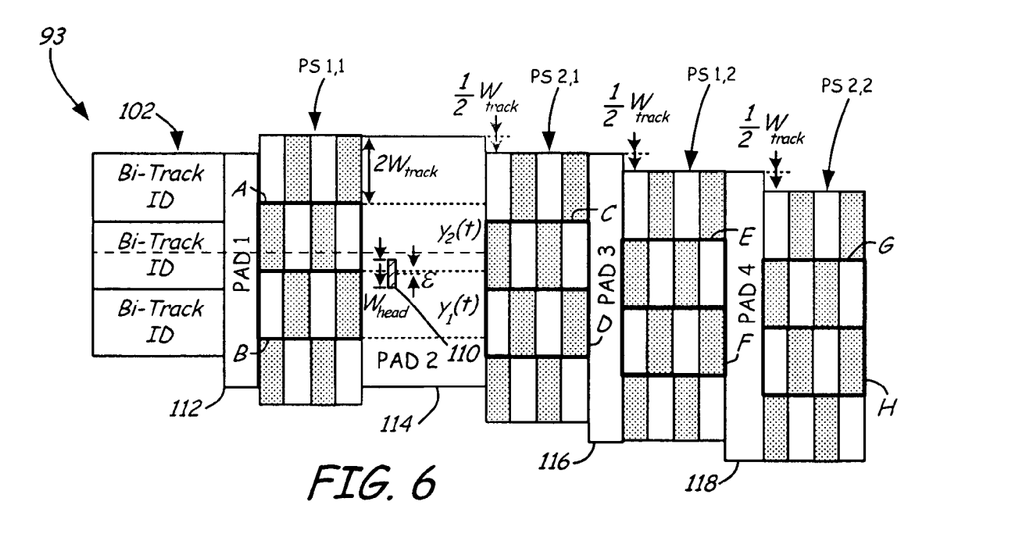
FIG. 6 is a diagram illustrating the positioning of a transducer head using the servo sector format of the present invention.

FIGS. 3-5 illustrate a number of exemplary embodiments in which the widths of the permanent servo marks are greater than the width associated with the data tracks the servo marks identify. FIG. 6 describes in additional detail the method by which displacement estimates are generated based on servo marks having a width greater than the width of the data tracks.

FIG. 3 is block diagram illustrating an exemplary embodiment of recording medium 51 employing a servo sector format of the present invention. Recording medium 51 includes data tracks 52 and a servo sector 54, which in turn includes signal position fields 56, 58, 60 and 62. Each null burst 56, 58, 60 and 62 includes a first portion and a second portion (labeled portions 'A', 'B', 'C', 'D', 'E', 'F', 'G', and 'H', respectively). As shown in FIG. 3, the portions generated as part of signal position fields 56, 58, 60, and 62 each has a width that is greater than the width of the associated data tracks 52. In this particular embodiment, the lithographic tolerance of each null burst (i.e., the width of each portion of the null bursts) is twice that of each data track, although in other embodiments the ratio between the widths may be altered. In the exemplary embodiment shown in FIG. 3, null bursts 56, 58, 60, and 62 and in particular the portions included within each null burst are arranged in a 'quadrature' burst pattern. An alternative to quadrature burst patterns are the 'null' burst patterns illustrated in FIGS. 5 and 6. For purposes of determining displacement estimates $\hat{\varepsilon}$, both quadrature and null bursts operate in much the same way. In embodiments employing quadrature bursts, processing of the readback does not require any knowledge associated with the phase of the readback signal since each portion of the quadrature burst are offset from one another. In contrast, in a normal or non-quadrature null burst processing of a readback signal requires knowledge of both the amplitude and phase of the readback signal. For purposes of this description, the term null burst refers broadly to both implementations.

In this embodiment however, a trade-off to employing servo marks having dimensions greater than the dimensions of the associated data tracks is a decrease in format efficiency as the number of null bursts increases from two (in the conventional example shown in FIGS. 2A and 2B) to four (as shown in FIG. 3). However, in the embodiment shown in FIG. 3, the additional null bursts allow for the unique identification of four data tracks as indicated by the decoded track ID field 64. This is in contrast to the ability to distinguish only two track ID's in the conventional example shown in FIG. 2A.

FIG. 4 is a block diagram of an exemplary embodiment of recording medium 70 of the present invention in which two additional informational fields 84 and 86, labeled 'ID1' and 'ID2' are added to servo sector 74, each having a width greater than the width of data tracks 72. Once again, in this embodiment the width of the informational fields 84 and 86 is twice that of the data tracks, although in other embodiments the width of the informational fields may be greater than twice the width of the data tracks. The addition of informational fields 'ID1' and 'ID2' increases the number of unique tracks that can be identified from four to twenty. Informational fields 'ID1' and 'ID2' are similar to the track ID fields discussed with respect to FIG. 2B, except that each informational field has a width greater than that of the data tracks and therefore cannot distinguish individual tracks. As a result of information fields 'ID1' and 'ID2' can only provide positional informational in the range $[-1.5W_{track} < \varepsilon < 1.5W_{track}]$. For each additional set of informational bursts added to a servo sector format, the number of unique tracks that can be identified increases by a factor of five. For example, if a second set of informational bursts were added to the servo sector format shown in FIG. 4, the number of unique tracks that could be identified would increase from twenty to one hundred.

FIG. 5 is a block diagram of another exemplary embodiment of a recording medium 90 of the present invention, in which servo sector 93 consists of null bursts 94, 96, 98, and 100 each consisting of a set of portions (labeled 'A', 'B', 'C', 'D', 'E', 'F', and 'G', respectively). For instance, null patterns 'A' and 'B' are grouped together adjacent to one another in the cross-track direction, as are null patterns 'C' and 'D', 'E' and 'F', and 'H' and 'G', respectively. This is in contrast with the 'quadrature' pattern described with respect to FIGS. 3 and 4. In this way, the number of unique tracks that can be identified is maintained at twenty, but the amount of space required to store servo sector information is reduced from that shown in FIG. 4.

FIG. 6 is a block diagram illustrating in greater detail the process by which the servo sector format 93 (as shown in FIG. 5) is used to determine the displacement ε of transducer head 110 from the centerline of a desired track. As described with respect to FIG. 5, servo sector format 93 includes gray-coded bi-track ID 102, PAD pattern 112, null burst (labeled 'PS1,1') including first and second portions (labeled 'A' and 'B' respectively), PAD pattern 114, null burst (labeled 'PS 2,1') including first and second portions ('C' and 'D', respectively), PAD pattern 116, null burst (labeled 'PS1,2') including first and second portions ('E' and 'F', respectively), PAD pattern 118 and null burst (labeled 'PS 2,2') including first and second portions (labeled 'G' and 'H', respectively). Servo sector format 93 may also include many of the additional fields described with respect to FIG. 2B. However, these fields have been omitted from this description as they are not relevant to the method by which displacement estimates are generated.

In the embodiment shown in FIG. 6, first and second portions of each null burst are located adjacent to one another to form a coherency pattern that reduces the size of the servo sector format, similar to that described with respect to FIG. 5. Once again, each null burst is vertically shifted by ½ the width of the data tracks (i.e., $½W_{track}$) relative to neighboring null bursts. Thus, null burst 94 is vertically shifted by ½ a track width relative to null burst 96. Likewise, null burst 98 is vertically shifted by ½ a track width relative to null burst 96 and null burst 98 is vertically shifted by ½ a track width relative to null burst 100.

In the view shown in FIG. 6, unlike the views shown in FIGS. 3-5, the actual data tracks are not shown. Rather, each bi-track ID 102 (illustrated in FIG. 5 as informational bursts 102) spans two actual data tracks. As stated above, each bi-track ID 102 is gray-coded such that detection of an expected bi-track narrows the range of displacement into the range of $[-1.5 W_{track}, 1.5 W_{track}]$.

Figure 7:
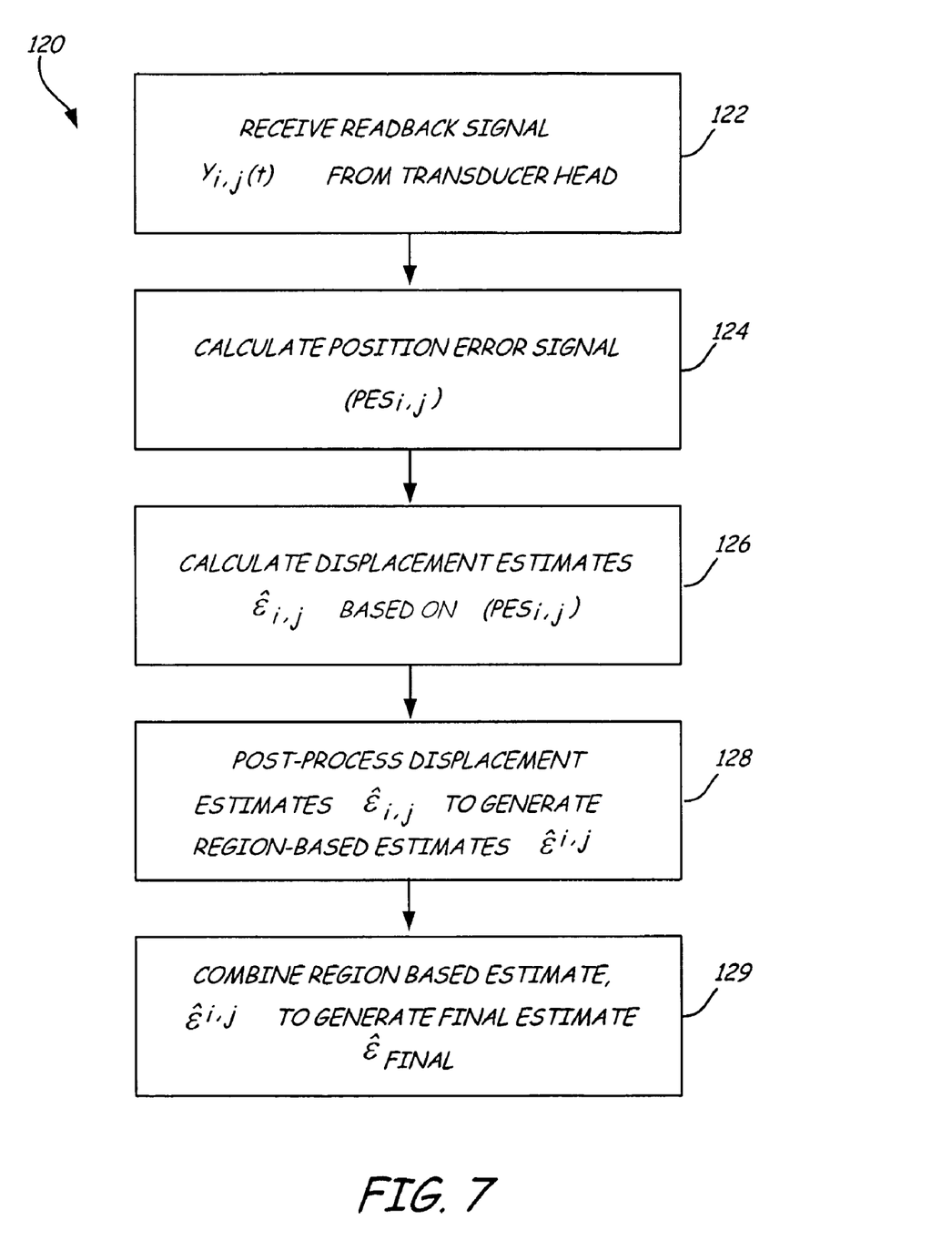
FIG. 7 is a flowchart illustrating the steps performed in estimating the displacement estimate $\epsilon$ of the head from the desired track.

FIG. 7 is a flowchart that outlines an exemplary method 120 of generating displacement estimates based on the servo sector format shown in FIG. 6. At step 122, servo demodulator (as shown in FIG. 1) receives readback signals $y_{i,j}(t)$ of the null burst $PS_{i,j}$ from transducer head 110. At step 124, based on the received readback signals, servo demodulator 16 calculates position error signals ($PES_{i,j}$) for each null burst PS 1,1, PS 2,1, PS 1,2, and PS 2,2 using conventional linear superposition techniques. At step 126, displacement estimates $\hat{\epsilon}_{i,j}$ are generated with respect to each null burst based on the $PES_{i,j}$ calculated at step 124. At step 128, servo demodulator executes post-processing algorithms to make region-based decisions regarding the likely location of transducer head 110, and as a result generate region-based displacement estimates $\hat{\epsilon}^{i,j}$. At step 129, the region-based displacement estimates $\hat{\epsilon}^{i,j}$ are combined into a final displacement estimate $\hat{\epsilon}_{final}$. Each step will now be described in additional detail with respect to FIG. 6.

At step 122, in response to transducer head 110 moving over each null burst a read-back signal (labeled $y_1(t)$ and $y_2(t)$) is generated. Thus, for each null burst (PS 1,1, PS 2,1, PS 1,2, and PS 2,2), a corresponding readback signal is generated. For purposes of description, the readback signal is labeled generally $y_{i,j}(t)$ where (i=1, 2 and j=1, 2). As discussed above with respect to FIG. 3, linear superposition is assumed in combining the readback signal generated as a result of transducer head 110 covering two adjacent portions of null burst patterns (e.g., portions 'A' and 'B' with respect to null burst PS 1,1), such that the readback signal can be represented by the following equation.

$$y_{i,j}(t) = \left(\frac{1}{2} + \frac{\varepsilon_{i,j}}{W_{head}}\right) * y_1(t) + \left(\frac{1}{2} - \frac{\varepsilon_{i,j}}{W_{head}}\right) * y_2(t) + e_{i,j}(t), \quad (1)$$
$$i = 1, 2; j = 1, 2$$

In equation (1), $e_{i,j}(t)$ represents the independent and identically distributed noise.

At step 124, based on conventional position error signal (PES) generation algorithms, the sample readback signal can be generated based on the following equation.

$$PES_{i,j} = \sum_k y_{i,j}(kT)(y_1(kT) - y_2(kT)) \quad (2)$$

The resulting position error signal generated for each null burst PS 1,1, PS 2,1, PS 1,2 and PS 2,2 is provided for post-processing to generate head displacement $\epsilon$. This task can be decomposed into two steps. At step 126, head displacement estimates $\hat{\epsilon}_{i,j}$ are calculated with respect to each null burst PS 1,1, PS 2,1, PS 1,2, and PS 2,2. At step 128, the displacement estimates generated for each null burst are analyzed and combined to generate a final position estimate, $\hat{\epsilon}_{final}$.

Based on the example described with respect to FIG. 6, head displacement estimates $\hat{\epsilon}_{i,j}$ (step 126) are generated based on the following equation.

$$\hat{\epsilon}_{i,j} = W_{head} \frac{PES_{i,j} - \beta}{\alpha}, i = 1, 2; j = 1, 2 \quad (3)$$

The right-side of equation (3) contains all known quantities, including position error signal ($PES_{i,j}$), the width of the transducer head, and quantities $\beta$ and $\alpha$ which are known based on the following equation.

$$\begin{cases} \alpha = \sum \kappa(y_1(kT) - y_2(kT))^2 \\ \beta = \frac{1}{2} \sum \kappa(y_1(kT) - y_2(kT))(y_1(kT) + y_2(kT)) \end{cases} \quad (4)$$

In addition, the estimation error associated with equation (3) can be defined as $$\tilde{\epsilon}_{i,j} = \hat{\epsilon}_{i,j} - \epsilon_{i,j} \quad (5)$$

Equations (2), (3), and (5) describe a well-known method of generating displacement estimates $\hat{\epsilon}_{i,j}$ based on an analysis of the amplitude associated with readback signals $y_{i,j}(t)$. However, because the lithographic tolerances of null bursts are larger than the data tracks, additional post-processing by servo demodulator 16 (as shown in FIG. 1) is required to generate an accurate final estimate of the displacement $\hat{\epsilon}_{final}$ based on the initial head displacement estimates $\hat{\epsilon}_{i,j}$ calculated with respect to equation (5).

At this point the servo control system has behaved in much the same manner as a conventional servo sector format having servo patterns with widths equal to the width of data tracks, wherein the amplitude of readback signals $y_{i,j}(t)$ are employed to generate estimates of head displacement $\epsilon_{i,j}$. At step 128, additional region-based processing is performed to generate region based-displacement estimates $\hat{\epsilon}^{i,j}$ based on regional information provided by analyzing the PES-based estimates $\hat{\epsilon}_{i,j}$. At step 129, the region-based estimates are combined to generate a final displacement estimate $\epsilon_{final}$.

Figure 8:
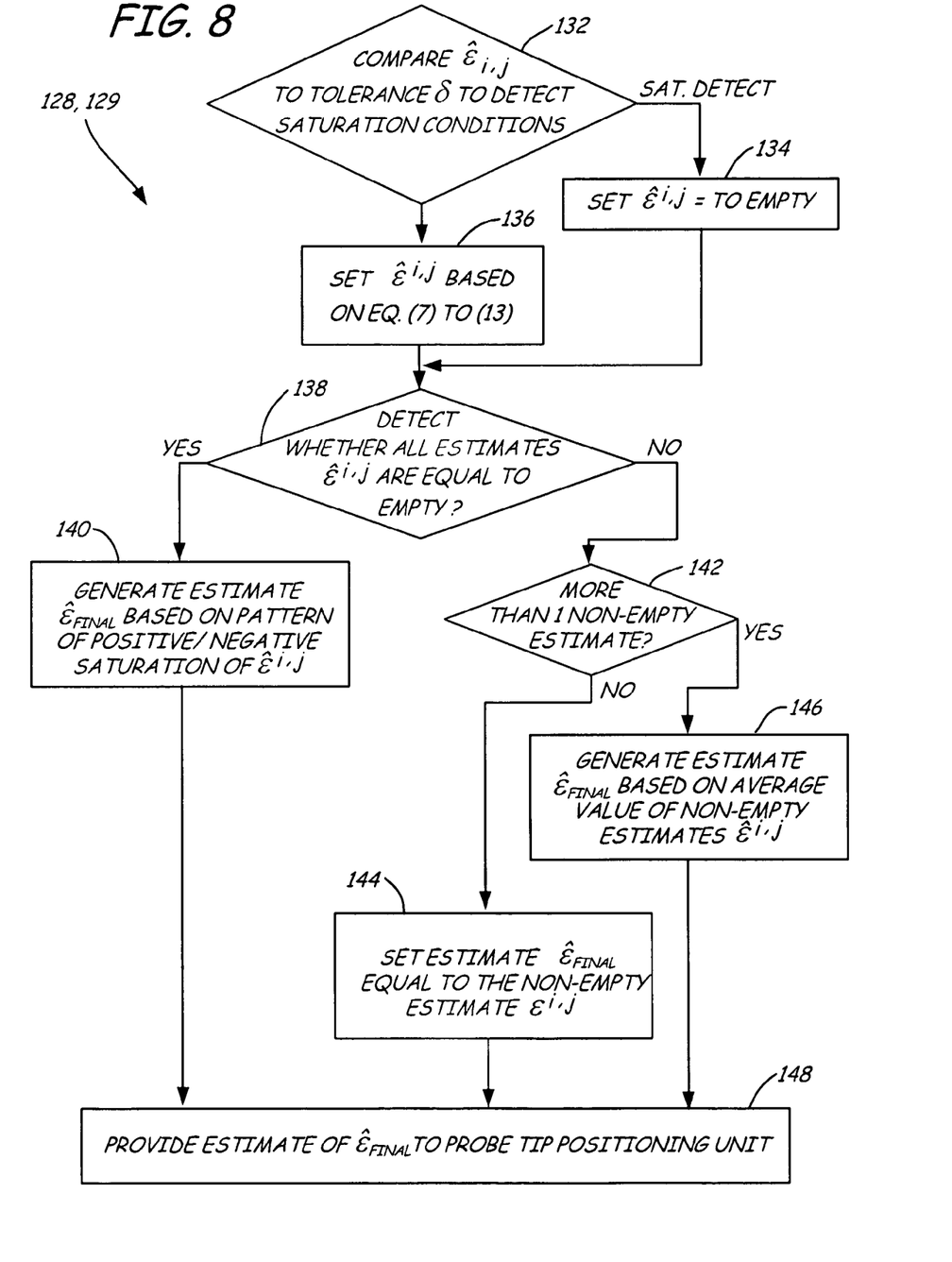
FIG. 8 is a flowchart illustrating the post-processing steps performed in generating the displacement estimate $\epsilon$.

FIG. 8 is a flowchart illustrating in greater detail the post-processing performed by servo demodulator 16 (at steps 128, 129) for calculating a final head displacement estimate $\hat{\epsilon}_{final}$. In an exemplary embodiment, post-processing steps 128 and 129 are performed by servo demodulator 16 (shown in FIG. 1). In other embodiments, post-processing steps 128 and 129 may be implemented with a combination of hardware and software capable of performing the function described with respect to FIG. 8.

At step 132 each PES-based displacement estimate $\hat{\epsilon}_{i,j}$ is compared to a threshold value $\delta$ to detect whether each displacement estimate $\hat{\epsilon}_{i,j}$ is saturated. A displacement estimate is said to be saturated when transducer head 110 is located such that no substantial part of transducer head 110 is located over a boundary between adjacent portions of a null burst. In this situation, the readback signal is dominated by a single portion of null burst and the resultant PES-based estimate is said to be saturated.

Thus, saturation occurs when transducer head 110 moves across a region that does not include a boundary between adjacent portions of a particular null bursts. Using null burst PS 1,1 as an example, the location of transducer head 110 can be divided into three regions.

1. Region 1: When $-1.5W_{track} \leq \epsilon \leq -0.5W_{head}$, $\hat{\epsilon}_{1,1}$ is saturated at its minimum of $-0.5W_{head}$
2. Region 2: When $-0.5 W_{track} < \epsilon < 0.5 W_{track}$, $\hat{\epsilon}_{1,1} = \epsilon$ 3. Region 3: When $0.5W_{track} \leq \epsilon \leq 1.5W_{head}$, $\hat{\epsilon}_{1,1}$ is saturated at its maximum of $0.5W_{head}$ That is, when the entire length of transducer head 110 is located over null portion 'A', the displacement estimate $\hat{\epsilon}_{1,1}$ is said to be negatively saturated such that the only information that can be gained is that transducer head 110 is located somewhere over null portion 'A' (i.e., wherein the displacement $\epsilon$ is defined within the range of Region 1). Likewise, when the entire length of transducer head 110 is located over null portion 'B', the displacement estimate $\hat{\epsilon}_{1,1}$ is said to be positively saturated such that the only information that can be gained is that transducer head 110 is located somewhere over null portion 'B' (i.e., wherein the displacement $\epsilon$ is defined within the range of Region 3). Only in the situation in which the length of transducer head 110 spans at least a portion of both null portion 'A' and null portion 'B' can a resulting head displacement estimate $\hat{\epsilon}_{1,1}$ be considered as providing specific information regarding the actual displacement $\epsilon$ of the transducer head 110 from the centerline of the desired track.

Thus, at step 132 each displacement estimate $\hat{\epsilon}_{i,j}$ is compared to a threshold value $\delta$ such that a region decision can be made (i.e., which of the displacement estimates $\hat{\epsilon}_{i,j}$ indicate saturation conditions). The tolerance value $\delta$ is selected such that the probability of the following events is maintained to be true.

$$\hat{\epsilon}_{1,1} - 0.5W_{head} > -\delta \text{ when } \hat{\epsilon}_{1,1} \text{ is positively saturated}$$

$$\hat{\epsilon}_{1,1} - (-0.5W_{head}) < \delta \text{ when } \hat{\epsilon}_{1,1} \text{ is negatively saturated} \qquad (6)$$

In this way, comparing the estimated displacement $\hat{\epsilon}_{i,j}$ to the selected tolerance value $\delta$ allows servo demodulator 16 to determine whether the estimated displacement is saturated, and whether the saturation is negative or positive. The selection of the tolerance value $\delta$ is therefore important to correctly categorizing estimates as saturated or non-saturated. That is, if the tolerance value $\delta$ is too small, the probability of the comparison indicating a saturated state will be high, and less information can be obtained based on a saturated state than an unsaturated state. The tolerance value $\delta$ is designed, in part, to tolerate the randomness associated with displacement estimates $\hat{\epsilon}$. One source of such randomness is electronic noise, the strength of which is measured by a signal-to-noise ratio (SNR). In conditions in which the SNR is unknown, then the tolerance value $\delta$ must be selected conservatively (i.e., is a large value) to tolerate worst-case scenarios. In conditions in which the SNR is known, then the tolerance value $\delta$ can be selected more precisely (i.e., smaller value) to generate better performance in the sense that the probability of displacement estimates being categorized as saturated will decrease, providing additional information in calculating a final displacement estimate.

In response to a determination that a particular PES-based displacement estimate $\hat{\epsilon}_{i,j}$ is either negatively or positively saturated, then at step 134 the region-based displacement estimate $\hat{\epsilon}^{i,j}$ (a superscript is used to distinguish region-based displacement estimates from PES-based estimates from which they are derived) is set to an empty state to indicate that specific location data cannot be retrieved. In an exemplary embodiment, this includes indicating whether the displacement estimate $\hat{\epsilon}_{i,j}$ indicates negative or positive saturation. For example, in response to a comparison of head displacement estimate $\hat{\epsilon}1,1$ (as calculated based on $PES_{1,1}$) indicating that the estimated displacement estimated is negatively saturated, the displacement estimate $\hat{\epsilon}^{i,j}$ is set to empty, indicating that the displacement estimate $\hat{\epsilon}_{1,1}$ does not provide specific information that can be used to identify the location of transducer head 110. This is not to say that no information can be gained by a determination of negative or positive saturation, only that no specific information regarding the location of the head can be deduced.

In response to a determination that a particular displacement estimate $\hat{\epsilon}_{i,j}$ is not saturated, other displacement estimates are reviewed to make a region decision, and based on that decision a region-based displacement estimate can be generated at step 136. For instance, with respect to null burst PS 1,1, if the PES-based displacement estimate $\hat{\epsilon}_{1,1}$ is non-saturated, then the region-based displacement estimated $\hat{\epsilon}^{1,1}$ is calculated based on the following equation:

$$\hat{\epsilon}^{1,1} = \hat{\epsilon}_{1,1} \qquad (7)$$

This reflects that with respect to null burst PS 1,1, a determination that the PES-based head displacement estimate $\hat{\epsilon}_{1,1}$ is not saturated results in an assignment of region-based displacement $\hat{\epsilon}^{1,1} = \hat{\epsilon}_{1,1}$. This is the simplest case, based on the fact that the boundary between null portions 'A' and 'B' of null burst PS 1,1 are coextensive with the centerline of the desired data track. As a result, region-based head displacement estimate $\hat{\epsilon}^{1,1}$, without any additional constraint handling or decision-making, can be set equal to the PES-based displacement estimate $\hat{\epsilon}_{1,1}$.

With respect to PES-based head displacement estimates $\hat{\epsilon}_{i,j}$ other than $\hat{\epsilon}_{1,1}$, a number of conditions are reviewed before generating a region-based displacement estimate $\hat{\epsilon}^{i,j}$. The generation of region-based estimates $\hat{\epsilon}^{i,j}$ varies based on the null burst being analyzed. The following conditions and equations describe how estimates $\hat{\epsilon}^{i,j}$ are generated for each servo sector burst other than PS 1,1. With respect to PES-based estimates $\hat{\epsilon}_{2,1}$, assuming the estimates do not indicate a saturated condition, the following equations are used to generate a region-based estimate $\hat{\epsilon}^{2,1}$.

1. Estimate $\hat{\epsilon}^{2,1}$ from $\hat{\epsilon}_{2,1}$.
   a. When $\hat{\epsilon}_{1,1}$ is negatively saturated, estimate $\hat{\epsilon}^{2,1}$ as:

$$\hat{\epsilon}^{2,1} = 1.5W_{track} - \hat{\epsilon}_{2,1} \qquad (8)$$

b. When $\hat{\epsilon}_{1,1}$ is NOT negatively saturated (i.e., either positively saturated or not saturated), estimate $\hat{\epsilon}^{2,1}$ as:

$$\hat{\epsilon}^{2,1} = \hat{\epsilon}_{2,1} + 0.5W_{track} \qquad (9)$$

The reason for these constraints can be visualized with respect to FIG. 6. With respect to null burst PS 2,1, the negative saturation of PES-based displacement estimate $\hat{\epsilon}_{1,1}$ indicates that the length of transducer head 110 lies entirely over null portion 'A' (although the estimate $\hat{\epsilon}_{1,1}$ does not indicate the exact location of transducer head 110 because of the fact that the estimation is saturated). Based on that information, if PES-based displacement estimate $\hat{\epsilon}_{2,1}$ is not saturated, then the assumption is that transducer head 110 is located on the boundary between null portion 'C' and the portion located just above null portion 'C'. As a result of this region-based information, equation 8 is employed to generate a region-based displacement estimate $\hat{\epsilon}^{2,1}$. Likewise, if PES-based estimate $\hat{\epsilon}_{1,1}$ is NOT negatively saturated (either by being positively saturated or not saturated at all) then the assumption is that transducer head 110 is located near the boundary of portion 'C' and null portion 'D'. As a result, equation 9 is used to generate region-based estimate $\hat{\epsilon}^{2,1}$ based on PES-based estimated $\hat{\epsilon}_{2,1}$.

With respect to PES-based estimates $\hat{\epsilon}_{1,2}$ generated with respect to null burst PS 1,2, assuming once again that the estimates do not indicate a saturated state, the following equations are used to generate region-based estimate $\hat{\epsilon}^{1,2}$.

2. Estimate $\hat{\epsilon}^{1,2}$ from $\hat{\epsilon}_{1,2}$.
   a. When $\hat{\epsilon}_{1,1}$ is negatively saturated, estimate $\hat{\epsilon}^{1,2}$ as:

$$\hat{\epsilon}^{1,2} = -W_{track} - \hat{\epsilon}_{1,2} \qquad (10)$$

b. When $\hat{\epsilon}_{1,1}$ is NOT negatively saturated (i.e., either positively saturated or not saturated), estimate $\hat{\epsilon}^{1,2}$ as:

$$\hat{\epsilon}^{1,2} = \hat{\epsilon}_{1,2} + W_{track} \qquad (11)$$

With respect to null burst PS 1,2, the negative saturation of PES-based displacement estimate $\hat{\epsilon}_{1,1}$ once again indicates that the length of transducer head 110 lies entirely over portion 'A'. Based on that information, if PES-based displacement estimate $\hat{\epsilon}_{1,2}$ is not saturated, then the assumption is that transducer head 110 is located on the boundary between portion 'E' and the portion located just above portion 'E'. As a result, equation 10 is employed to generate a region-based displacement estimate $\hat{\epsilon}^{1,2}$. Likewise, if PES-based estimate $\hat{\epsilon}_{1,1}$ is NOT negatively saturated (either by being positively saturated or not saturated at all) then the assumption is that transducer head 110 is located near the boundary of portion 'E' and portion 'F'. As a result, equation 11 is used to generate region-based estimate $\hat{\epsilon}^{1,2}$ based on PES-based estimated $\hat{\epsilon}_{1,2}$.

With respect to PES-based estimates $\hat{\epsilon}_{2,2}$ generated with respect to null burst P 2,2, assuming once again that the estimates do not indicate a saturated state, then the following equations are used to generate region-based estimate $\hat{\epsilon}^{2,2}$.

3. Estimate $\hat{\epsilon}^{2,2}$ from $\hat{\epsilon}_{2,2}$.
   a. When $\hat{\epsilon}_{1,1}$ is NOT positively saturated, estimate $\hat{\epsilon}^{2,2}$ as:

$$\hat{\epsilon}^{2,2} = -0.5 W_{track} - \hat{\epsilon}_{2,2} \qquad (12)$$

b. When $\hat{\epsilon}_{1,1}$ is positively saturated or not saturated, estimate $\hat{\epsilon}^{2,2}$ as:

$$\hat{\epsilon}^{2,2} = \hat{\epsilon}_{2,2} + 1.5 W_{track} \qquad (13)$$

With respect to null burst PS 2,2, the condition in which PES-based displacement estimate $\hat{\epsilon}_{1,1}$ is NOT positively saturated (i.e., either negatively saturated or not saturated at all) indicates that the length of transducer head 110 lies entirely over portion 'A' (negatively saturated) or a portion of the length of transducer head 110 lies over the boundary of portions 'A' and 'B'. Based on that information, if PES-based displacement estimate $\hat{\epsilon}_{2,2}$ is not saturated, then the assumption is that transducer head 110 is located on the boundary between portion 'H' and the portion located just above portion 'H'. As a result, equation 12 is employed to generate a region-based displacement estimate $\hat{\epsilon}^{2,2}$. Likewise, if PES-based estimate $\hat{\epsilon}_{1,1}$ is positively saturated or not saturated then the assumption is that transducer head 110 is located near the boundary of portion 'H' and portion 'G'. As a result, equation 13 is used to generate region-based estimate $\hat{\epsilon}^{2,2}$ based on PES-based estimated $\hat{\epsilon}_{2,2}$.

Hence, PES-based estimates $\hat{\epsilon}_{i,j}$ are used to make decisions regarding the region in which transducer head 110 is operation. Based on this region identification, the PES-based estimate $\hat{\epsilon}_{i,j}$ corresponding to each null burst can be analyzed to yield region-based displacement estimates $\hat{\epsilon}_{i,j}$. In embodiments were additional null bursts are employed, either due to ever increasing widths of the null bursts relative to the width of the data tracks (for instance, width of the portions of the null bursts could be more than twice the width of the data tracks) or due to the need to uniquely identify additional data tracks, then additional PES-based displacement estimates $\hat{\epsilon}_{i,j}$ must be categorized as saturated or non-saturated and provided for post-processing as described above. In embodiments in which the width of null bursts is increased or decreased relative to the example shown in FIG. 6 will result in slight modification of equations (8)-(13).

After all PES-based displacement estimates $\hat{\epsilon}_{i,j}$ have been set to an empty state if saturated or analyzed as described above if non-saturated, at step 138 region-based displacement estimates $\hat{\epsilon}^{i,j}$ are reviewed to determine whether all estimates are equal to an empty state. In situations in which the above steps did not result in the generation of a non-empty region-based displacement estimate (i.e., because all PES-based displacement estimates were categorized at step 132 as saturated), a final displacement estimate $\hat{\epsilon}$ can still be generated based on an analysis of the negative or positive saturation state of each displacement estimate $\hat{\epsilon}^{i,j}$.

At step 140, in response to a determination that all region-based displacement estimates $\hat{\epsilon}^{i,j}$ are empty, a final displacement estimate $\hat{\epsilon}_{final}$ is generated by first representing the region-based estimates $\hat{\epsilon}^{i,j}$ as an n-bit number, wherein n represents the number of null bursts employed. In the example shown in FIG. 6, the region-based estimates $\hat{\epsilon}^{i,j}$ are represented as a four-bit number, represented as $B = b_1, b_2, b_3$, and $b_4$. The most significant bit of B, $b_1$, is set to '1' when PES-based displacement estimate $\hat{\epsilon}_{1,1}$ is positively saturated, and set to '0' in all other cases (e.g., when $\hat{\epsilon}_{1,1}$ is negatively saturated). Similarly, the remaining bits of B, $b_2$, $b_3$, and $b_4$, are set according to whether the PES-based estimates $\hat{\epsilon}_{2,1}$, $\hat{\epsilon}_{1,2}$, and $\hat{\epsilon}_{2,2}$ are positively or negatively saturated. For the example shown in FIG. 6, based on the layout of the null bursts relative to one another, there are six cases that must be analyzed. The six possible cases, as well as expected range of displacement estimates that can be derived based on the combination of positively and negatively saturated signals is provided below.

1. B=0011: It happens around the range $\epsilon \in [-W_{track} - 0.5W_{head}, -1.5W_{track} + 0.5W_{head}]$.

2. B=0001: It happens around the range $\epsilon \in [-0.5W_{track} - 0.5W_{head}, -W_{track} + 0.5W_{head}]$.

3. B=0001: It happens around the range $\epsilon \in [-0.5W_{head}, -0.5W_{track} + 0.5W_{head}]$.

4. B=0000: It happens around the range $\epsilon \in [0.5W_{track} - 0.5W_{head}, 0.5W_{head}]$.

5. B=1000: It happens around the range $\epsilon \in [-W_{track} - 0.5W_{head}, 0.5W_{track} + 0.5W_{head}]$.

6. B=1100: It happens around the range $\epsilon \in [1.5W_{track} - 0.5W_{head}, W_{track} + 0.5W_{head}]$. (14)

Each of the possible scenarios, as well as the expected displacement range that can be derived based on each scenario. For example, in the first case (i.e., B=0011) indicates that displacement estimate $\hat{\epsilon}_{1,1}$ is negatively saturated, $\hat{\epsilon}_{2,1}$ is negatively saturated, $\hat{\epsilon}_{1,2}$ is positively saturated, and $\hat{\epsilon}_{2,2}$ is positively saturated. Thus, with respect to FIG. 6, the negative saturation of estimates $\hat{\epsilon}_{1,1}$ and $\hat{\epsilon}_{2,1}$ implies that the length of transducer head is located, for the most part or entirely, over portion 'A' of null burst PS1,1 and portion 'C' of null burst PS2,1. The positive saturation of estimates $\hat{\epsilon}_{1,2}$ and $\hat{\epsilon}_{2,2}$ implies that the length of transducer head 110 is located, for the most part or entirely, over the portion located above portion 'E' in null burst PS1,2 and the portion located above portion 'G' in null burst PS2,2. Thus, transducer head 110 is likely located just below the boundary between portion 'C' and the portion located just above portion 'C' in null burst PS2,1, and just above the boundary between portion 'E' and the portion located just above portion 'E'. This range is defined by the range of $\epsilon$ described in equation 17 by the first case.

Continuing the discussion of case 1, we determined that transducer head 110 is likely located near the boundaries between portions in null bursts PS 2,1 and PS1,2. Therefore, the PES-based estimates of $\hat{\epsilon}_{2,1}$ and $\hat{\epsilon}_{1,2}$, although classified as saturated at step 132, are considered the most relevant to generating displacement estimate $\hat{\epsilon}$. At a first end of the range defined above (i.e., $\epsilon \approx -W_{track} - 0.5W_{head}$), the transducer head will be located near the boundary between portion 'C' and the portion above portion 'C', and thus the PES-based estimate $\hat{\epsilon}_{2,1}$, although negatively saturated, may not be negatively saturated at the maximum value of $-0.5W_{head}$. Likewise, at this approximate location, the transducer head will likely be located farther away from the boundary between portion 'E' and the portion above portion 'E'. As a result, the PES-based estimate $\hat{\epsilon}_{1,2}$ will likely be positively saturated at it's maximum value of $0.5W_{head}$.

At the other end of the range (i.e., $\epsilon \approx -1.5W_{track} + 0.5W_{head}$), transducer head 110 will be located near the boundary between portion 'E' and the portion above portion 'E', and thus the PES-based estimate $\hat{\epsilon}_{1,2}$, although identified as positively saturated, may not be positively saturated at the maximum value of $0.5W_{head}$. Likewise, at this approximate location, the transducer head 110 will likely be located farther away from the boundary between portion 'C' and the portion located above portion 'C'. As a result, the PES-based estimate $\hat{\epsilon}_{2,1}$ will likely be negatively saturated at its minimum value of $-0.5W_{head}$.

Thus, having established the relationship between $\hat{\epsilon}_{2,1}$ and $\hat{\epsilon}_{1,2}$ in this region, a combination of these signals can be used to establish the likely region in which the transducer head 110 is located and based on the region selection the PES-based estimates $\hat{\epsilon}_{2,1}$ and $\hat{\epsilon}_{1,2}$ can be used to generate a final displacement estimate $\hat{\epsilon}_{final}$. For example, in the embodiment described above, the following algorithm is used to determine a displacement estimate, labeled $\hat{\epsilon}^{0011}$.

1. When $\hat{\epsilon}_{2,1} + \hat{\epsilon}_{1,2} \geq W_{head} - 0.5W_{track}$, the estimate of $\hat{\epsilon}^{0011}$ is defined by the following equation:

$$\hat{\epsilon}^{0011} = 1.5W_{track} + 0.5W_{head} - (\hat{\epsilon}_{2,1} + \hat{\epsilon}_{1,2}) \tag{15}$$

2. When $-W_{head} + 0.5W_{track} < \hat{\epsilon}_{2,1} + \hat{\epsilon}_{1,2} \leq W_{head} - 0.5W_{track}$, the estimate of $\hat{\epsilon}^{0011}$ is defined by the following equation:

$$\hat{\epsilon}^{0011} = 1.25W_{track} - 0.5W_{head}(\hat{\epsilon}_{2,1} + \hat{\epsilon}_{1,2}) \tag{16}$$

3. When $\hat{\epsilon}_{2,1} + \hat{\epsilon}_{1,2} < -W_{head} + 0.5W_{track}$, the estimate of $\hat{\epsilon}^{0011}$ is defined by the following equation:

$$\hat{\epsilon}^{0011} = -W_{track} - 0.5W_{head} - (\hat{\epsilon}_{2,1} + \hat{\epsilon}_{1,2}) \tag{17}$$

The remaining situations in which all PES-based estimates $\hat{\epsilon}_{i,j}$ are saturated are outlined below, along with the means used to estimate a displacement estimate.

1. When B=0001, we estimate $\hat{\epsilon}$ from $\hat{\epsilon}_{1,2} + \hat{\epsilon}_{2,2}$.
2. When B=0000, we estimate $\hat{\epsilon}$ from $\hat{\epsilon}_{2,2} - \hat{\epsilon}_{1,1}$.
3. When B=1000, we estimate $\hat{\epsilon}$ from $\hat{\epsilon}_{1,1} + \hat{\epsilon}_{2,1}$.
4. When B=1100, we estimate $\hat{\epsilon}$ from $\hat{\epsilon}_{2,1} + \hat{\epsilon}_{1,2}$.
5. When B=1110, we estimate $\hat{\epsilon}$ from $\hat{\epsilon}_{1,2} + \hat{\epsilon}_{2,2}$.

In this way, even in situations in which all PES-based displacement estimates $\hat{\epsilon}_{i,j}$ are categorized as saturated, a final displacement estimate $\hat{\epsilon}_{final}$ can still be generated Returning to step 138, if one or more the estimates $\hat{\epsilon}_{i,j}$ are not classified as empty (i.e., at least one PES-based estimated $\hat{\epsilon}_{i,j}$ was not classified as saturated) then at step 142 a determination is made whether more than one non-empty state exists.

For situations in which only a single non-empty estimate has been calculated then the non-empty estimate $\hat{\epsilon}$ (i.e., the region-based estimate generated $\hat{\epsilon}^{i,j}$ from step 136) is provided as the final displacement estimate $\hat{\epsilon}_{final}$.

For situations in which more than one region-based estimate $\hat{\epsilon}^{i,j}$ generated at step 136 is non-empty, then at step 146 a final estimate $\hat{\epsilon}_{final}$ is generated by averaging all non-empty region-based estimates $\hat{\epsilon}^{i,j}$. Because each region-based estimate $\hat{\epsilon}^{i,j}$ is independent of all other region-based estimates $\hat{\epsilon}^{i,j}$, the simplest manner in which the non-empty estimates are combined is by linear averaging. For example, if region-based estimates $\hat{\epsilon}^{1,1}$ and $\hat{\epsilon}^{2,1}$ are both non-empty, then the following equation is used to combine the estimates.

$$\hat{\epsilon}_{avg} = \frac{1}{2}(\hat{\epsilon}^{1,1} + \hat{\epsilon}^{2,1}) \tag{18}$$

As a result of these steps, a final displacement estimate $\hat{\epsilon}_{final}$ is generated and provided as an output by servo demodulator 16 to controller 12 (via summer 18) at step 148. Controller 12 uses the final displacement estimate $\hat{\epsilon}_{final}$ to position transducer head 110 over the desired track. In other exemplary, additional techniques may be employed to generate an average of non-empty region-based estimates $\hat{\epsilon}^{i,j}$.

In this way, the present disclosure describes a novel servo sector format which allows the lithographic tolerances of null bursts are larger than the widths of the associated data tracks. Conventional processing of read-back signals is used to generate position error signals (PES) and associated PES-based displacement estimates $\hat{\epsilon}_{i,j}$. Final and accurate displacement estimates can be generated by simple post-processing steps that account for challenges presented in accurately detecting the position of transducer head 110 using null bursts having a width greater than the width of the data tracks to be positioned over. A benefit of the present invention is the ability to accurately position transducer heads over small pitch data tracks using permanent servo section marks that can be generated using conventional lithographic techniques.

Although the present invention has been described with reference to preferred embodiments, workers skilled in the art will recognize that changes may be made in form and detail without departing from the spirit and scope of the invention. In particular, the present invention has been described with respect to a servo sector format in which the width of portions included in each null burst were defined as twice that of the data tracks. In other embodiments, the width of each portion may be increased or decreased as desired for a particular application. For example, if the lithographic tolerance requirement were changed from twice the width of the data track to N-times the data track, the following changes would be made to the layout of the servo sector format. First, bi-track ID as shown in FIG. 6 would be altered to a N-track ID, which would be gray-coded and arranged to cover N tracks of data. In addition, null bursts would be modified such that each null burst would be N-tracks wide. In addition, if the width of the null bursts was increased to N-tracks wide, then the number of null bursts required to accurately generate displacement estimates would be 2N. The length of each pattern would remain unchanged, but once again, each pattern would be positioned $\frac{1}{2}W_{track}$ from a neighboring null burst. Finally, additional estimates $\hat{\epsilon}_{i,j}$ would be generated with respect to each null burst, and post-processing similar to that described above would have to be performed for each estimate to generate region-based estimates $\hat{\epsilon}^{i,j}$. In turn, the region-based estimates would be analyzed to generate a final estimate that can be used by controller 12 in positioning transducer head 12 over a desired track.

The invention claimed is:
1. A data storage system comprising:
a data storage medium comprising:
a plurality of data tracks defined by a width d1; and
a plurality of permanent servo sectors pre-recorded on the storage medium, wherein each servo sector includes a first null burst that includes a first portion and second portion and a null burst that includes a third portion and fourth portion, wherein each portion of the null bursts is defined by a width d2 that is greater than the width d1 of the data tracks;

a transducer head that is positionable over a desired track and finely positionable based on readback signals generated in response to the permanent servo sectors;

a servo demodulator connected to receive readback signals generated by the transducer head and to generate a first position error signal in response to the first null burst and a second position error signal in response to the second null burst, and uses region information provided by the first and second position error signals to generate a first region-based displacement estimate and a second region-based displacement estimate, wherein the servo demodulator calculates a final displacement estimate based on the first and second region-based displacement estimates; and a controller for generating servo control instructions to control the positioning of the transducer head over a desired track based on the final displacement estimate generated by the servo demodulator.

2. The data storage system of claim 1, wherein the servo demodulator detects region information based on the first and second position error signals by classifying whether the first or second position error signals are positively saturated, negatively saturated or not saturated.

3. The data storage system of claim 2, wherein the servo demodulator sets the first region-based estimate to empty if the first position error signal is classified as either negatively or positively saturated, otherwise the first region-based estimate is set to a non-zero value based on the first position error signal.

4. The data storage system of claim 3, wherein the servo demodulator sets the second region-based estimate to empty if the second position error signal is classified as either negatively or positively saturated, otherwise, the region based-estimate is set to a non-zero value based on the second position error signal and the region information detected based on the classification of the first position error signal.

5. The data storage system of claim 4, wherein the servo demodulator generates the final displacement estimate based on additional region information if both the first and second region-based estimates are set to empty, wherein the additional region information is based on the whether the first and second displacement estimates are negatively or positively saturated.

6. The data storage system of claim 4, wherein the servo demodulator generates the final displacement estimate based on a linear combination of the first and second region-based estimates if both the first and second region-based estimates are non-empty.

7. The data storage system of claim 4, wherein the servo demodulator generates the final displacement estimate based solely on the first or second region-based estimate if one of the region-based estimates is empty and one is non-empty.

8. The data storage system of claim 1, wherein the width d2 of each null pattern is n-times the width of the data tracks.

9. The data storage system of claim 8, wherein the number of null bursts provided on the storage medium is related to the ratio defined by the width d2 of the null patterns and the width d1 of the data tracks.

10. A method for determining displacement of a transducer head from a desired track using servo sector fields, each servo sector field having at least a first null burst having a first portion and a second portion and a second null burst having a third portion and a fourth portion, wherein a width d2 associated with each of the portions is greater than a width d1 of the data tracks, the method comprising:

receiving readback signals generated by the transducer head in response to each position signal field;

generating position error signals (PES) for each null burst based on the readback signals received with respect to each position signal field;

generating a first PES-based displacement estimate with respect to the first null burst and a second PES-based displacement estimate with respect to the second null burst;

extracting region-based information by classifying each PES-based displacement estimate as either negatively saturated, positively saturated, or not saturated;

generating region-based displacement estimates for each null burst based on a combination of the PES-based displacement estimates and the region-based information extracted from the classification of each PES-based displacement estimate; and generating a final displacement estimate based on the region-based displacement estimate.

11. The method of claim 10, wherein generating region-based displacement estimates includes:

setting a first region-based estimate to empty if the first PES-based displacement estimate is classified as either negatively or positively saturated, otherwise the region-based estimate is set to non-zero based on the first PES-based estimate generated with respect to the first null burst.

12. The method of claim 11, wherein generating region-based displacement estimates includes:

setting a second region-based estimate to empty if the second PES-based displacement estimate is classified as either negatively or positively saturated, otherwise, the second region based-estimate is set to a non-zero value based on the second PES-based displacement estimate generated with respect to the second null burst and the region-based information extracted based on the classification of the first PES-based displacement estimate.

13. The method of claim 12, wherein generating the final displacement estimate includes:

extracting additional region-based information if both the first and second PES-based estimates are classified as saturated based on the whether the first PES-based estimate is positively or negatively saturated and whether the second PES-based estimate is positively or negatively saturated;

selecting relevant PES-based estimates based on the additional region-based information; and generating a final displacement estimate based on a combination of the selected relevant PES-based estimates and the extracted region-based information.

14. The method of claim 12, wherein generating the final displacement estimate includes:

linearly combining the non-empty region-based estimates to generate the final displacement estimate.

15. The method of claim 10, further including:

positioning the transducer head over the desired track based on the final displacement estimate.

16. A data storage medium comprising:

a plurality of data tracks defined by a width d1; and at least one servo sector format comprising:

a first null burst that includes a repeating pattern that consists of a first portion and a second portion;

a second null burst that includes a repeating pattern that consists of a third portion and a fourth portion, the second null burst being offset relative to the first null burst by ½ the width d1 of each of the plurality of data tracks;
a third null burst that includes a repeating pattern that consists of a fifth portion and a sixth portion, the third null burst being offset relative to the second null burst by ½ the width d1 of each of the plurality of data tracks; and
a fourth null burst that includes a repeating pattern that consists of a seventh portion and an eighth portion, the fourth null burst being offset relative to the third null burst by ½ the width d1 of each of the plurality of data tracks, wherein each portion of the null bursts is defined by a width d2 that is greater than the width d1 of the data tracks.

17. The data storage medium of claim 16, wherein the servo sector further includes:
a plurality of track identification fields each having a width d3 greater than the width d1 of each of the plurality of data tracks.

18. The data storage medium of claim 17, wherein the width d3 of the track identification field is N times the width of each of the plurality of data tracks, such that each track identification field spans N data tracks.

19. The data storage medium of claim 16, wherein the number of null bursts is increased to increase the number of unique data tracks that can be identified by the position signal fields.

20. The data storage medium of claim 16, wherein the number of null bursts is increased in response to the ratio defined by the width d2 of each position signal field and the width d1 of each data track is increased.

21. The data storage medium of claim 16, wherein lithographic processes are used to generate the permanent servo marks that make up the position signal fields.

* * * * *

UNITED STATES PATENT AND TRADEMARK OFFICE
CERTIFICATE OF CORRECTION

| | | |
|---|---|---|
| PATENT NO. | : 7,576,942 B1 | Page 1 of 1 |
| APPLICATION NO. | : 12/107521 | |
| DATED | : August 18, 2009 | |
| INVENTOR(S) | : Darren William Karns et al. | |

It is certified that error appears in the above-identified patent and that said Letters Patent is hereby corrected as shown below:

In claim 1, col. 15, line 2,
   delete "and a null burst",
   insert --and a second null burst--

In claim 4, col. 15, line 38-39,
   delete "region based-estimate",
   insert --region-based estimate--

Signed and Sealed this
Nineteenth Day of July, 2011

David J. Kappos
*Director of the United States Patent and Trademark Office*